United States Patent
Xie et al.

(10) Patent No.: US 7,623,127 B2
(45) Date of Patent: Nov. 24, 2009

(54) METHOD AND APPARATUS FOR DISCRETE MESH FILLETING AND ROUNDING THROUGH BALL PIVOTING

(75) Inventors: Hui Xie, Plainsboro, NJ (US); Jin Zhou, Forest Hills, NY (US); Gregory G. Slabaugh, Princeton, NJ (US); Gozde Unal, West Windsor, NJ (US); Tong Fang, Morganville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 346 days.

(21) Appl. No.: 11/466,211

(22) Filed: Aug. 22, 2006

(65) Prior Publication Data

US 2007/0153000 A1    Jul. 5, 2007

Related U.S. Application Data

(60) Provisional application No. 60/742,440, filed on Dec. 5, 2005, provisional application No. 60/740,366, filed on Nov. 29, 2005, provisional application No. 60/742,503, filed on Dec. 5, 2005.

(51) Int. Cl.
*G06T 15/00* (2006.01)
*G06T 17/00* (2006.01)
*G09G 5/00* (2006.01)

(52) U.S. Cl. .................... 345/419; 345/420; 345/428; 345/581

(58) Field of Classification Search .................. 345/420, 345/428, 581
See application file for complete search history.

(56) References Cited

U.S. PATENT DOCUMENTS 4,987,554 A * 1/1991 Kaufman .................. 345/424

(Continued)

FOREIGN PATENT DOCUMENTS

WO    01/50417 A2    7/2001

(Continued)

OTHER PUBLICATIONS

Kaufman et al.; 3D Scan-Conversion Algorithms for Voxel-Based Graphics; Interactive 3D Graphics; Oct. 1986; pp. 45-75.*

(Continued)

*Primary Examiner*—Xiao M Wu
*Assistant Examiner*—David T Welch

(57) ABSTRACT

A method and apparatus for rounding a sharp edge of a model of an object is disclosed whereby a ball is propagated in a desired direction along the edge to be smoothed. The position of the ball at each point in its propagation is noted and, as a result, a virtual tunnel through which the ball passed may be constructed. Points on the sides of the surface of the object in proximity to the sharp edge are then projected onto the virtual tunnel by connecting with a line each point in proximity to the sharp edge to the center of the tunnel. New projected points are created at each position on the surface of the tunnel where the lines intersect that surface. The original points along the sharp edge are then hidden or deleted and the points along the virtual tunnel are connected via well-known surface reconstruction methods. In this way, a sharp edge of a triangle mesh model are advantageously smoothed.

15 Claims, 14 Drawing Sheets

U.S. PATENT DOCUMENTS

| | | | |
|---|---|---|---|
| 6,229,553 B1* | 5/2001 | Duluk et al. | 345/506 |
| 6,515,659 B1* | 2/2003 | Kaye et al. | 345/419 |
| 6,516,092 B1* | 2/2003 | Bachelder et al. | 382/181 |
| 6,968,299 B1 | 11/2005 | Bernardini | |
| 2003/0214501 A1* | 11/2003 | Hultgren et al. | 345/419 |
| 2003/0218609 A1* | 11/2003 | Maillot et al. | 345/423 |
| 2005/0057561 A1* | 3/2005 | El-Din ElShishiny et al. | 345/419 |
| 2006/0164415 A1* | 7/2006 | Smith et al. | 345/423 |
| 2006/0176304 A1* | 8/2006 | Ji | 345/426 |
| 2007/0109299 A1* | 5/2007 | Peterson | 345/423 |

FOREIGN PATENT DOCUMENTS

WO      2005/022468 A      3/2005

OTHER PUBLICATIONS

Liu et al, "Mesh blending", The Visual Computer; International Journal of Computer Graphics, Springer-Verlag, BE, vol. 21, No. 11, Oct. 1, 2005, pp. 915-927.

Vida et al, "A survey of blending methods that use parametric surfaces", Computer Aided Design, Elsevier Publishers BV., Barking, GB, vol. 26, No. 5, May 1, 1994, pp. 341-365.

D. Levin, "Mesh-Independent Surface Interpolation", Geometric Modeling for Scientific Visualization, Edited by Brunnett, Hamann and Mueller, Springer-Verlag, 2003, pp. 37-49.

F. Bernardini, et al., "The Ball-Pivoting Algorithm for Surface Reconstruction", IEEE Transactions on Visualization and Computer Graphics, 1999.

Y. Chen, et al., "Filleting and Rounding Using a Point-Based Method", Proc. of DETC'05, 2005 ASME Design Engineering Technical Conferences and Computers and Information in Engineering Conference, Long Beach, CA, Sep. 24-28, 2005, pp. 1-10.

T. Igarashi, et al., "Smooth Meshes for Sketch-Based Freeform Modeling", Proc. of the 2003 Symposium on Interactive 3D Graphics, Monterey, CA, 2003, pp. 139-142.

M. Desbrun, et al., "Implicit Fairing of Irregular Meshes Using Diffusion and Curvature Flow", Proc. of the 28th Annual Conference on Computer Graphics and interactive Techniques, 1999, pp. 317-324.

T. Jones. et al., "Non-Iterative, Feature-Preserving Mesh Smoothing", ACM Transactions on Graphics (TOG), Proc. of ACM SIGGRAPH, vol. 22, Issue 3, Jul. 2003, pp. 943-949.

L Kobbelt, "Discrete Fairing and Variational Subdivision for Freeform Surface Design", The Visual Computer, 2000, pp. 142-158.

S. Fleishman, et al "Bilateral Mesh Denoising", ACM Transactions on Graphics TOG), Proc. of ACM SIGGRAPH, vol. 22, Issue 3, Jul. 2003, pp. 950-953.

W. Press, et al., "Numerical Recipes in C: The Art of Scientific Computing", Cambridge, Cambridge University Press, 1989, pp. 59-71.

G. Taubin, "A Signal Processing Approach to Fair Surface Design", IBM T.J. Watson Research Center, ACM Press, New York, NY, 1995.

* cited by examiner

METHOD AND APPARATUS FOR DISCRETE MESH FILLETING AND ROUNDING THROUGH BALL PIVOTING

CROSS-REFERENCE TO RELATED APPLICATIONS

This patent application claims the benefit of U.S. Provisional Application No. 60/742,440, filed Dec. 5, 2005, which is hereby incorporated by reference herein in its entirety.

The present application is also related to U.S. patent application Ser. No. 11/466,194, titled Method and Apparatus for Non-Shrinking Mesh Smoothing Using Local Fitting, filed Aug. 22, 2006; and U.S. patent application Ser. No. 11/466,204, titled Method and Apparatus for Fast and Efficient Mesh Simplification, filed Aug. 22, 2006, both of which are hereby incorporated by reference herein in their entireties.

BACKGROUND OF THE INVENTION

The present invention relates generally to three-dimensional mesh shapes and, more particularly, to the filleting and rounding of sharp edges of such mesh shapes.

Many applications, such as medical and industrial design and manufacturing applications, involve manipulating and editing digital models of objects that have been scanned via, illustratively, 3D scanning of the object. As one skilled in the art will understand, such digital models typically consist of a point cloud representation of the object, with the number of points depending upon the resolution of the scanning process. Once such a point cloud representation has been obtained, the surface of the object is, in many instances, then approximated by connecting the points of the point cloud to form a mesh of triangles on the surface of the point cloud representation. This surface may then be edited by using, for example, computer aided design (CAD) software programs or similar specialized image manipulation software programs.

Many editing operations are extremely well known and are integrated into most computer aided design (CAD) software programs. Two illustrative and well-known operations, referred to herein as filleting and rounding, are frequently applied to digital models of a three dimensional shape to smooth out, or round, a sharp edge of the model into a smoother edge. FIG. 1 shows an illustrative example of such filleting and rounding. Referring to that figure, shape 101 is, illustratively, a cross section of a three-dimensional object such as an aforementioned model of a shape stored in computer memory. Shape 101 has, for example, corner 102 and corner 103 for which rounding/filleting are desired to smooth the corners. By removing corners 102 and 103 and blending in the adjacent surfaces, smoothed surfaces 104 and 105 result. Surface 104 is referred to herein as a "rounded" surface, since that surface is convex. On the other hand, surface area 105 is referred to herein as "filleted", since that surface is concave.

In many situations, the editing of a triangle mesh model, such as the aforementioned model created from connecting the points obtained by 3D scanning of an object, will result in sharp edges. For example, FIG. 2 shows an illustrative 3D shape 201 that has been edited by cutting the shape 201 with cutting plane 202. Such a cutting operation produces a sharp edge 203 for which, illustratively, a rounded edge may be desirable.

SUMMARY OF THE INVENTION

The present inventors have recognized that, while prior methods for filleting and rounding are advantageous in many regards, they are also disadvantageous in some aspects. In particular, while prior attempts at filleting and rounding are well known, such techniques are primarily useful only on models having continuous surfaces. For models that have non-continuous surfaces, such as the triangle mesh surfaces of shape 201, such techniques are typically not satisfactory as such surfaces are not analytically computable. Thus, as one skilled in the art will recognize, such prior filleting and rounding techniques may produce a rough and bumpy surface and not a continuous smooth surface as is the desired output of such rounding and filleting techniques.

Accordingly, the present inventors have invented a method for filleting and/or rounding a triangle mesh model of a shape having sharp edges for which at least a first rounded edge is desired. Specifically, the present inventors have discovered that, by using a variation of a 3D ball-pivoting algorithm, a ball can be propagated along an edge of an object to be smoothed. The position of the ball at each point in its propagation is noted and, as a result, a virtual tunnel through which the ball passed can be constructed. Points on the sides of the surface of the object in proximity to the sharp edge are then projected onto the virtual tunnel by drawing a line between each point in proximity to the sharp edge and the center of the tunnel. New projected points are recorded at each position on the surface of the tunnel where the lines intersect that surface. The original points along the sharp edge are then hidden or deleted and the projected points along the virtual tunnel are connected via well-known surface reconstruction methods. In this way, a sharp edge of a triangle mesh model can be advantageously smoothed.

These and other advantages of the invention will be apparent to those of ordinary skill in the art by reference to the following detailed description and the accompanying drawings.

DETAILED DESCRIPTION

Figure 3A:
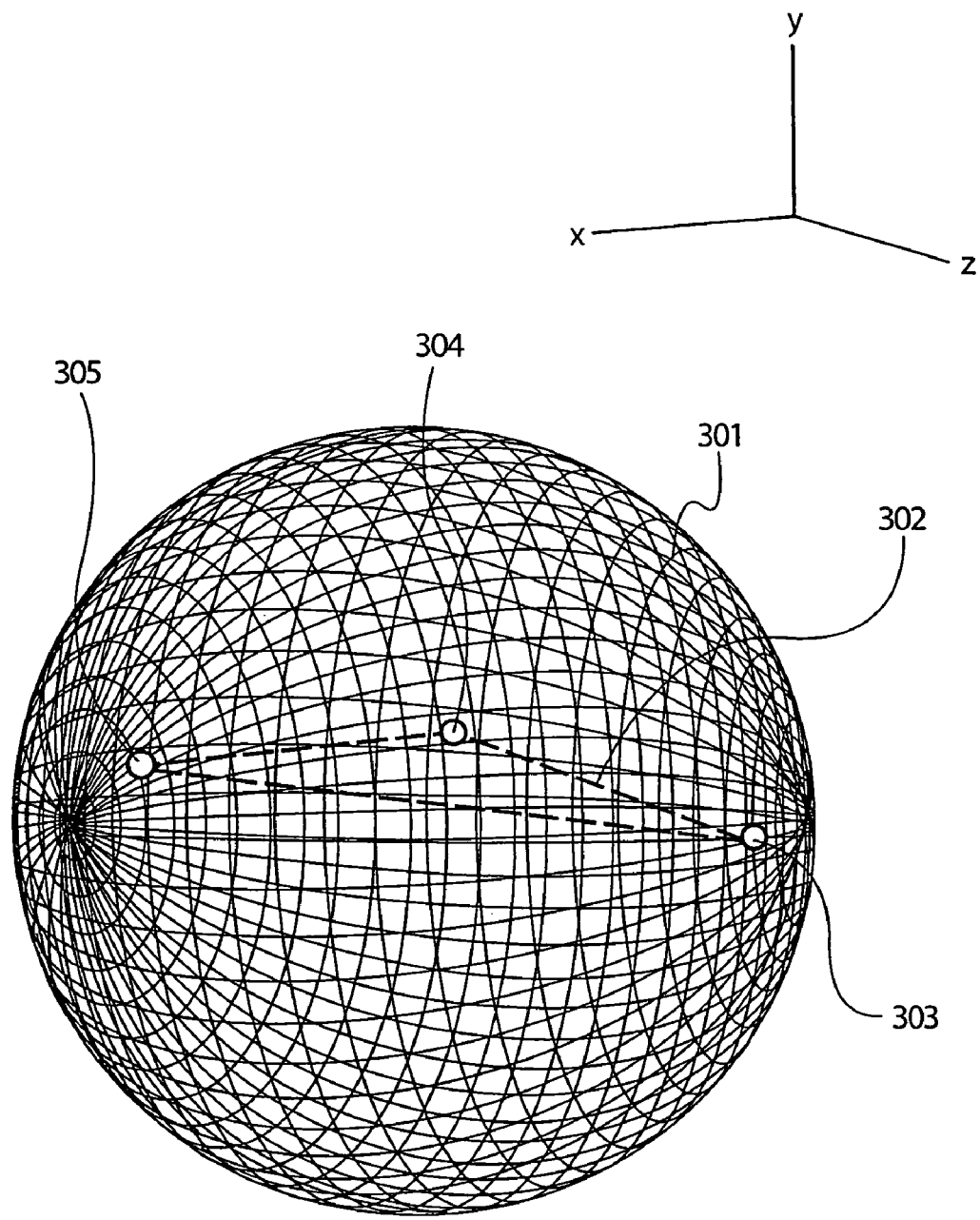
FIG. 3A shows a ball in an initial position relative to a seed triangle at the start of a prior ball-pivoting algorithm.
Figure 3B:
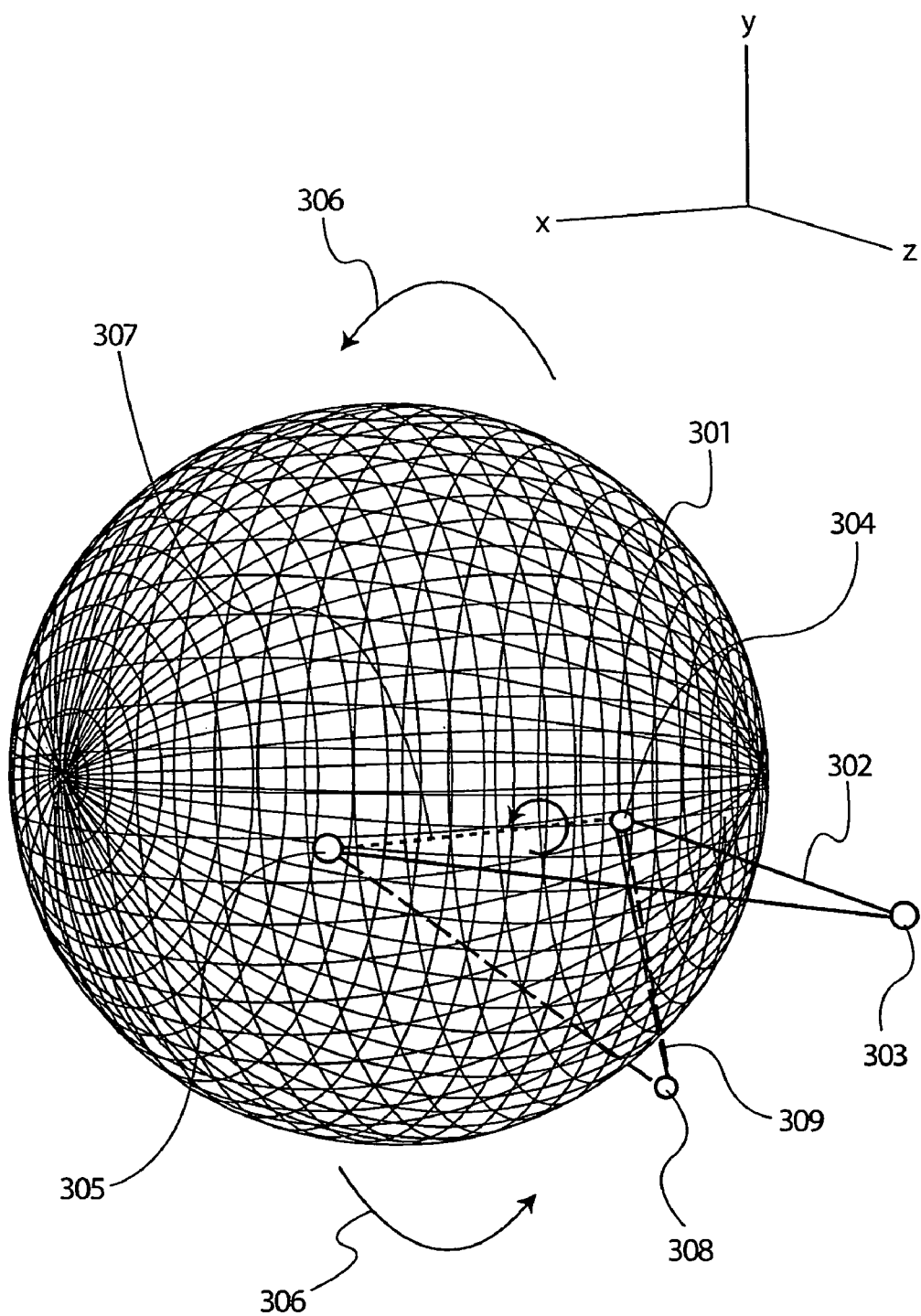
FIG. 3B shows how the ball of FIG. 3A is pivoted around a leg of the seed triangle to construct a triangle mesh surface in accordance with a prior ball-pivoting algorithm.

FIGS. 3A and 3B illustrate how a prior ball-pivoting algorithm may be used to construct a triangle mesh surface to approximate the surface of an object. Specifically, referring to FIG. 3A, the vertices of triangle 302, points 303, 304 and 305, are points in a point cloud representation of an object and lie on the surface of a model of a 3D object for which a triangle mesh approximation of the surface of the object is desired. Triangle 302 is herein referred to as a seed triangle as it is selected as an initial starting position of the operation of the ball-pivoting algorithm. Ball 301 having a desired radius (e.g., selected as a function of the density of points on the surface of the model) is then positioned initially so that each of points 303, 304 and 305 of triangle 302 lie on the surface of ball 301.

FIG. 3B illustrates how the rotation of ball 301 can be used to grow a triangle mesh approximation of the surface of an object. Specifically, referring to that figure and as discussed above, ball 301 is initially positioned so that the vertices of triangle 302 each lie on the surface ball 301. Then, one of the legs of the triangle, herein referred to as the pivot leg, is selected about which ball 301 will be pivoted. Here, leg 307 of triangle 302 is selected as the pivot leg. Then, ball 301 is pivoted about this leg, illustratively here in direction 306, with points 304 and 305 remaining fixed in place on the surface of the ball 301. Ball 301 is allowed to pivot until the surface of the ball comes into contact with another point on the surface of the model, here represented by point 308. When ball 301 contacts point 308, the pivoting of ball 301 in direction 306 then stops and, as a result, points 304, 305 and 308 will each lie on the surface of ball 301. Point 308 is then connected by lines with each end point of pivot leg 307, here points 304 and 305, to create a new triangle 309 on the surface of the model of the object. A different leg of triangle 309 is illustratively then selected as a new pivot leg and another triangle is created by pivoting ball 301 in a new direction until it contacts another point. Such a ball pivoting algorithm used for the construction of a triangle mesh surface is the subject of F. Bernardini et al., *The Ball-Pivoting Algorithm for Surface Reconstruction*, IEEE Transactions on Visualization and Computer Graphics, 5(4), October-December, 1999, pp. 349-359, which is hereby incorporated by reference herein in its entirety. Such an algorithm is well-known in the art and, therefore, will not be further described herein other than as is necessary for an understanding of the embodiments of the present invention.

Figure 1:
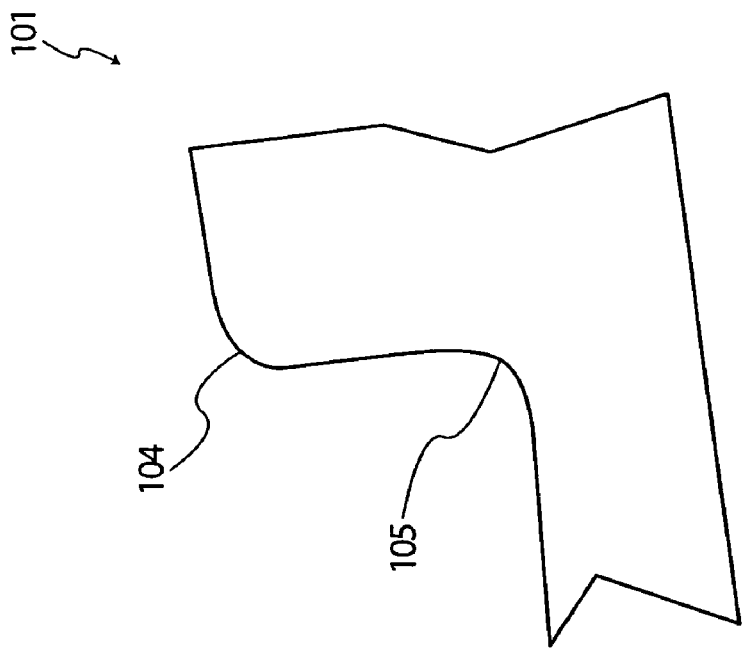
FIG. 1 shows a cross section of a 3D shape having sharp corners that are rounded and/or filleted.
Figure 1:
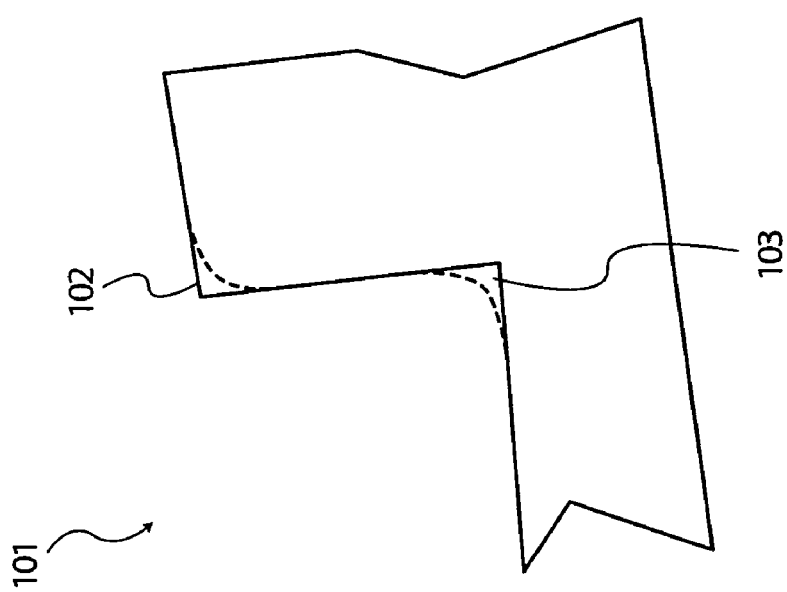
Figure 2:
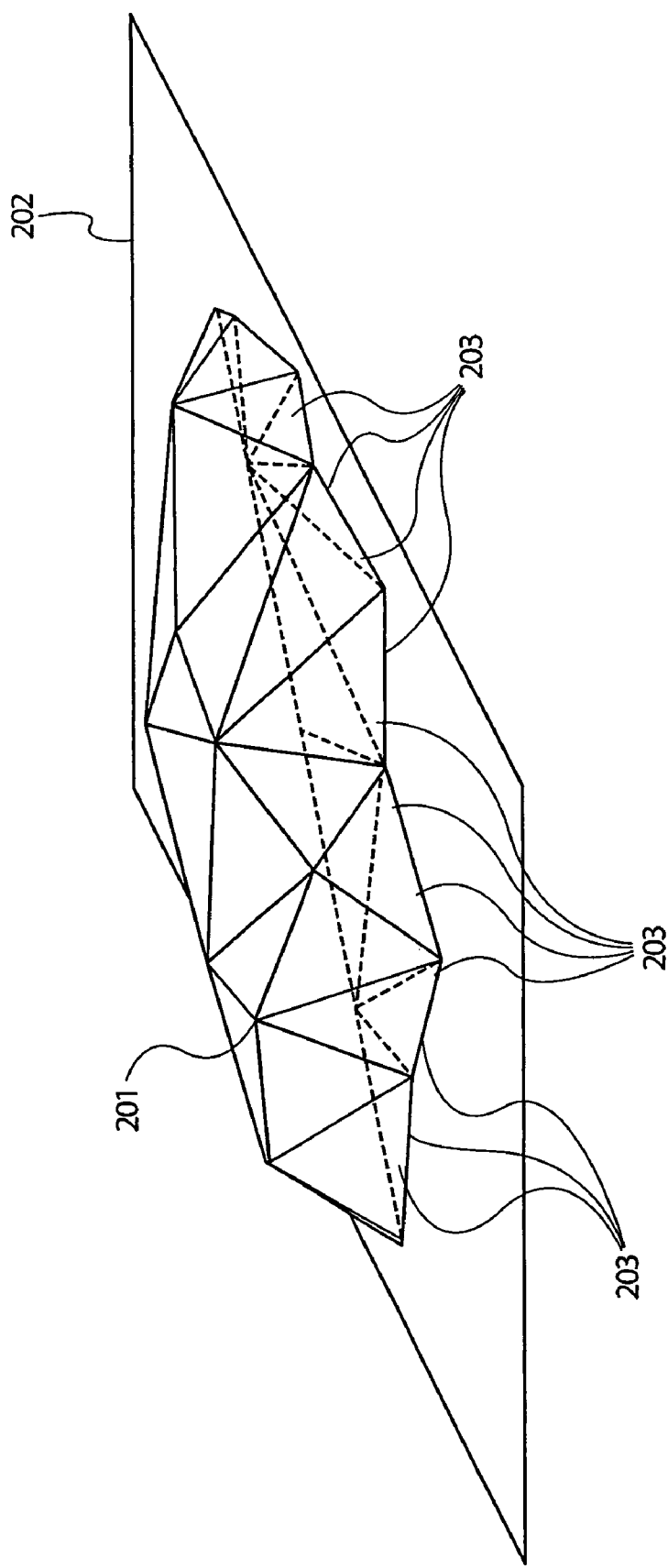
FIG. 2 shows an illustrative 3D shape that has been edited in a way such that sharp edges are produced.
Figure 4:
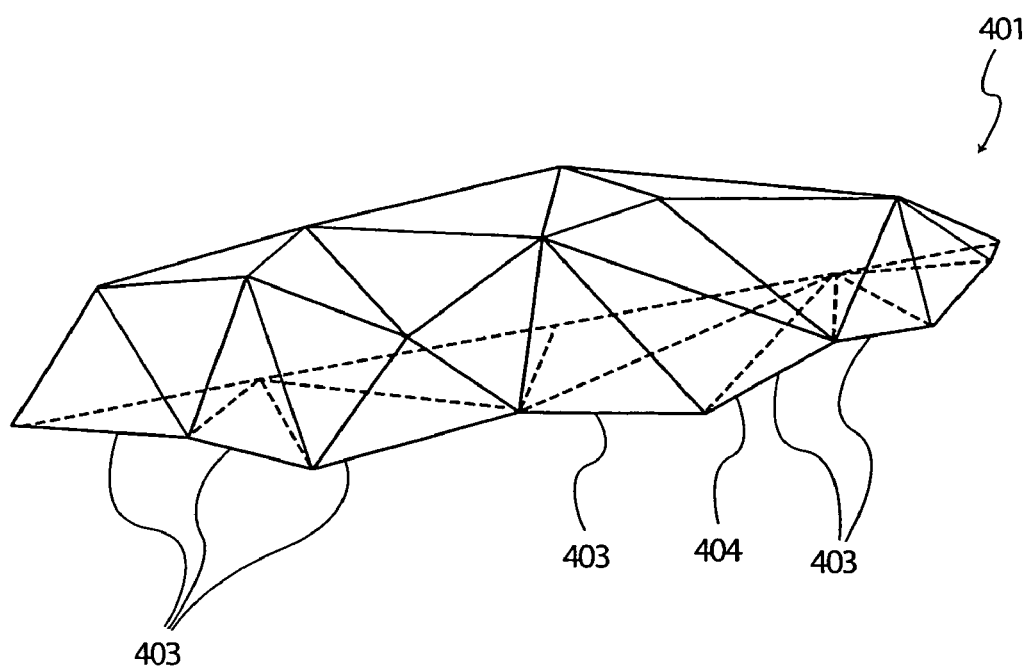
FIG. 4 shows the illustrative 3D shape of FIG. 2 and the resulting sharp edges.

FIG. 4 shows a 3D shape 401 that is, illustratively, the shape of FIG. 2 that was created by editing a triangle mesh model of an object using cutting plane 202. As discussed previously, the result of such editing is sharp edge 403, including edge portion 404, along the plane where shape 401 was cut. As also previously discussed, it is frequently advantageous to be able to smooth such sharp edges. The present inventors have recognized that such a smoothing of edge 403 may be accomplished using a variation of the ball-pivoting algorithm, discussed herein above. Specifically, as one skilled in the art will recognize, edge 403, including edge portion 404, consists of two sides that meet together to form the edge. This is more clearly seen with reference to FIG. 5 where, referring to that figure, sides 501 and 502 meet together along edge portion 404, which is the same edge portion 404 as shown in FIG. 4. By passing a ball, such as that used in the ball-pivoting algorithm, along edge portion 404 and the rest of edge 403, a virtual tunnel having a diameter equal to that of the ball, can be defined along edge 403. By then projecting points on each side of the edge 403 onto the surface of the virtual tunnel and then reconstructing the surface along that edge, a representation of a rounded edge will result.

Figure 5:
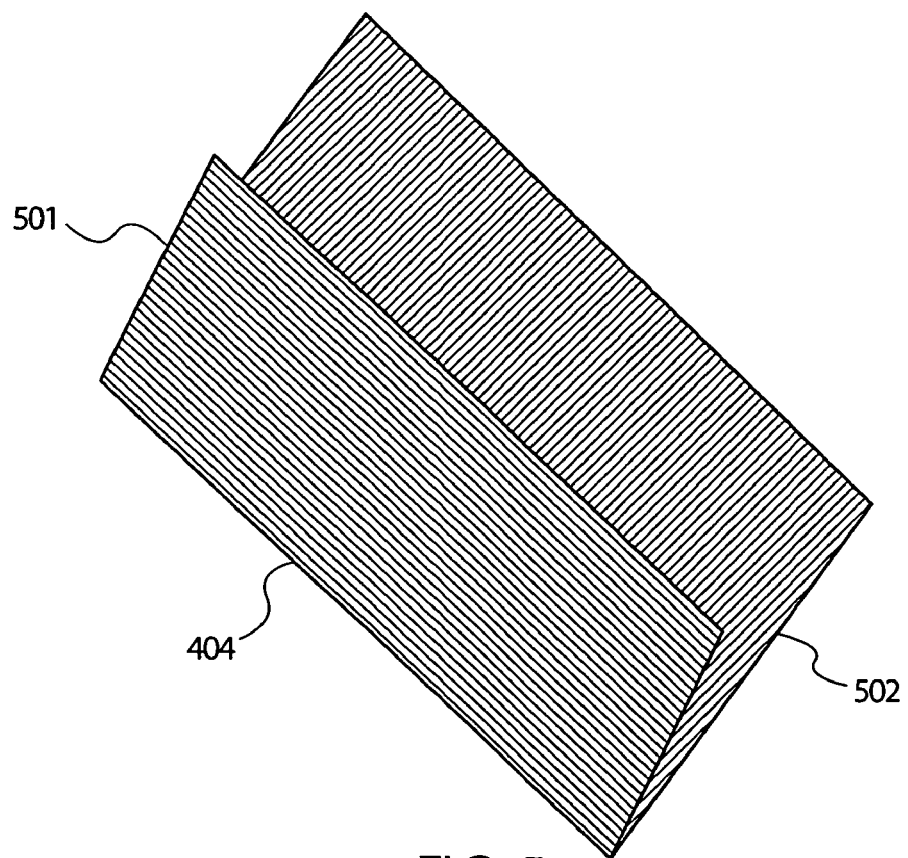
FIG. 5 shows a representation of a sharp edge of the 3D shape of FIG. 4.
Figure 6:
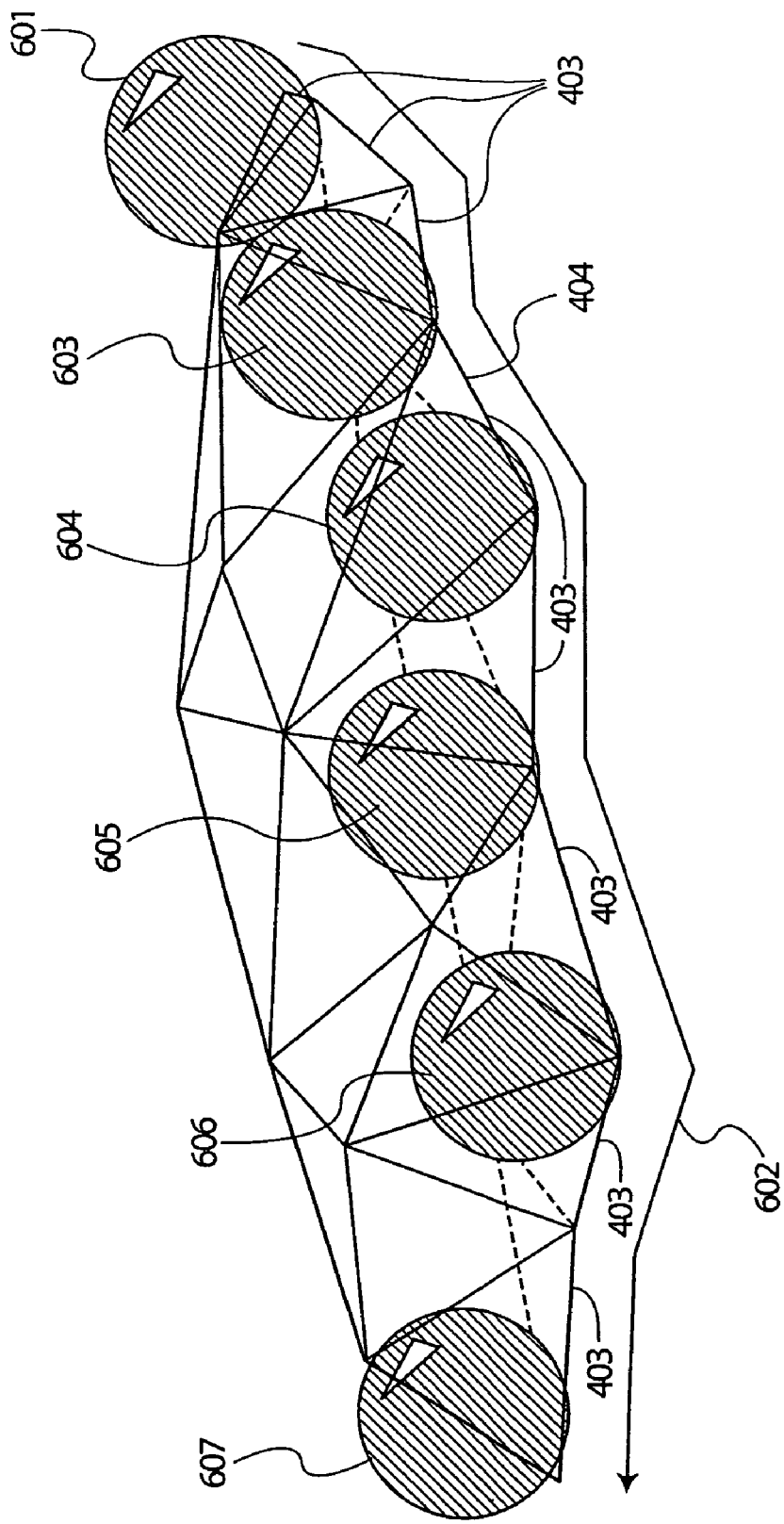
FIG. 6 shows a general representation of how a novel ball pivoting algorithm can move a ball along a sharp edge of the 3D shape of FIG. 4 in accordance with an embodiment of the present invention.
Figure 7A:
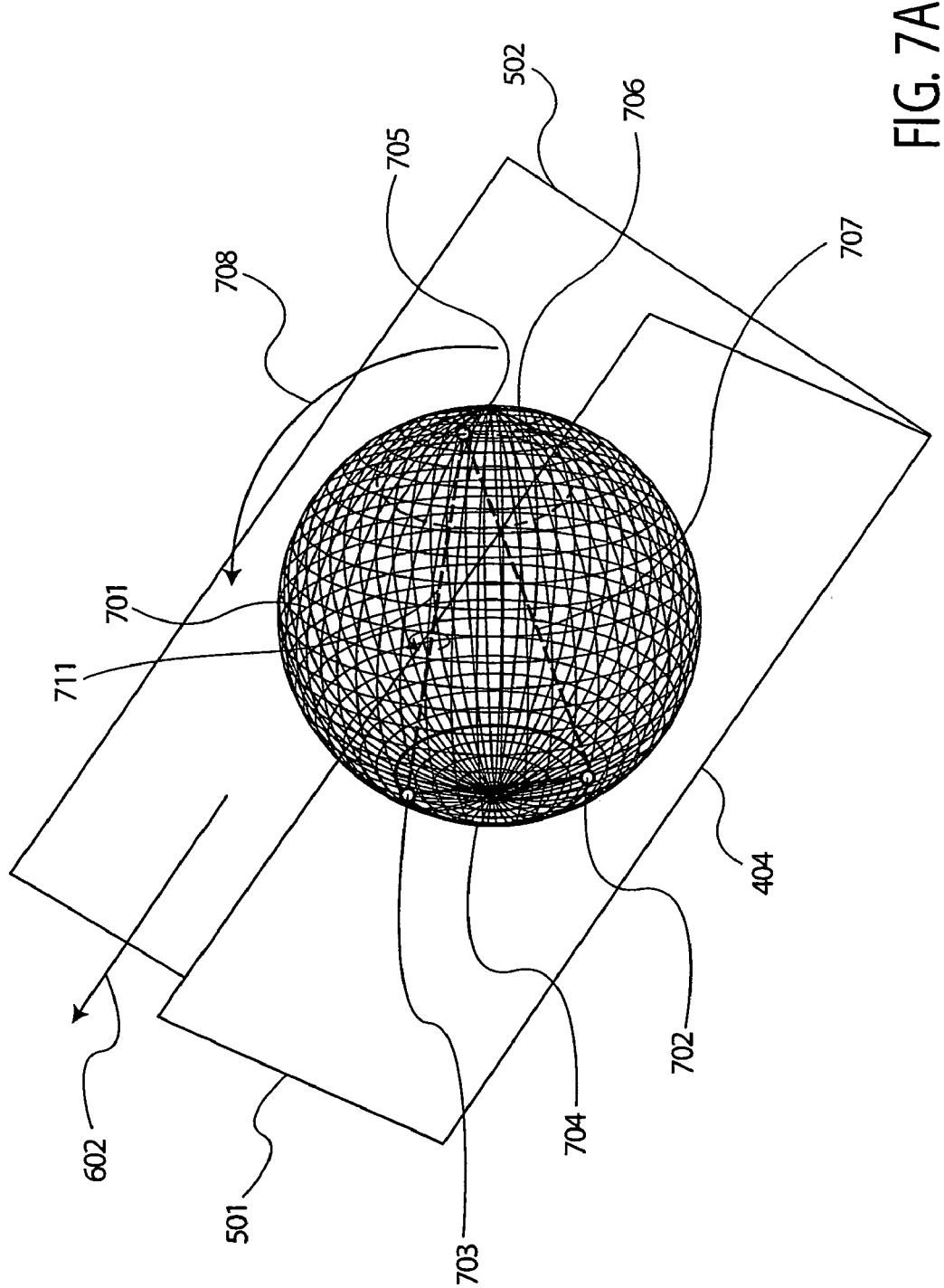
FIG. 7A shows how a ball can be positioned with respect to a seed triangle in the representation of FIG. 5 at the start of a rounding method in accordance with an embodiment of the present invention.

FIG. 6 shows one illustrative view of the edited 3D shape 401 of FIG. 4 having sharp edge 403 such as, once again, edge portion 404. In accordance with an embodiment of the present invention, a ball in position 601 is moved in direction 602 to successive positions 603-607 along the edge of shape 401. This movement is, for example, initiated in a similar fashion to the initiation of surface reconstruction in a ball-pivoting algorithm. In particular, a seed triangle is selected and the ball is then pivoted about a leg of that triangle until it comes into contact with another point on one of the two sides of the edge 403. Such a pivoting action is more clearly seen with reference to FIGS. 7A and 7B. Specifically, FIG. 7A once again shows sides 501 and 502 of FIG. 5 that, as discussed above, meet together to form edge portion 404 as shown in FIGS. 4, 5 and 6. In order to smooth edge portion 404 ball 701 is initially placed in a position whereby the three vertices of a seed triangle are located on the surface of the ball. In particular, referring again to FIG. 7A, points 702, 703 and 705 form seed triangle 707. Ball 701 intersects both surfaces 501 and 502, forming intersection circles 704 and 705. In this illustrative example, points 702 and 703 of seed triangle 707 lie on intersection circle 704 on side 501, while point 705 lies on intersection circle 706 on side 502. One skilled in the art will recognize in light of the teachings herein that at least one point of the seed triangle should lie on side 501 and one point should lie on side 502. Similarly, one skilled in the art will recognize that, in this embodiment, the seed triangle is selected such that, for example, no other points are inside the volume of ball 701 nor are there any other points in contact with the surface of ball 701 other than the vertices of the seed triangle 707 itself. Once ball 701 is positioned as shown in FIG. 7A, then ball 701 is pivoted along one leg of seed triangle 707. As one skilled in the art will recognize, this leg should be selected in order to achieve the desired motion of the ball along the edge to be smoothed, such as in direction 602. In the example shown in FIG. 7A, leg 711 of seed triangle 707 is selected about which ball 701 will pivot in direction 708 to move the ball in direction 602. Since ball 701 is pivoted about leg 711, which has endpoints 703 and 705, these endpoints will remain on the surface of ball 701 as it pivots.

Figure 7B:
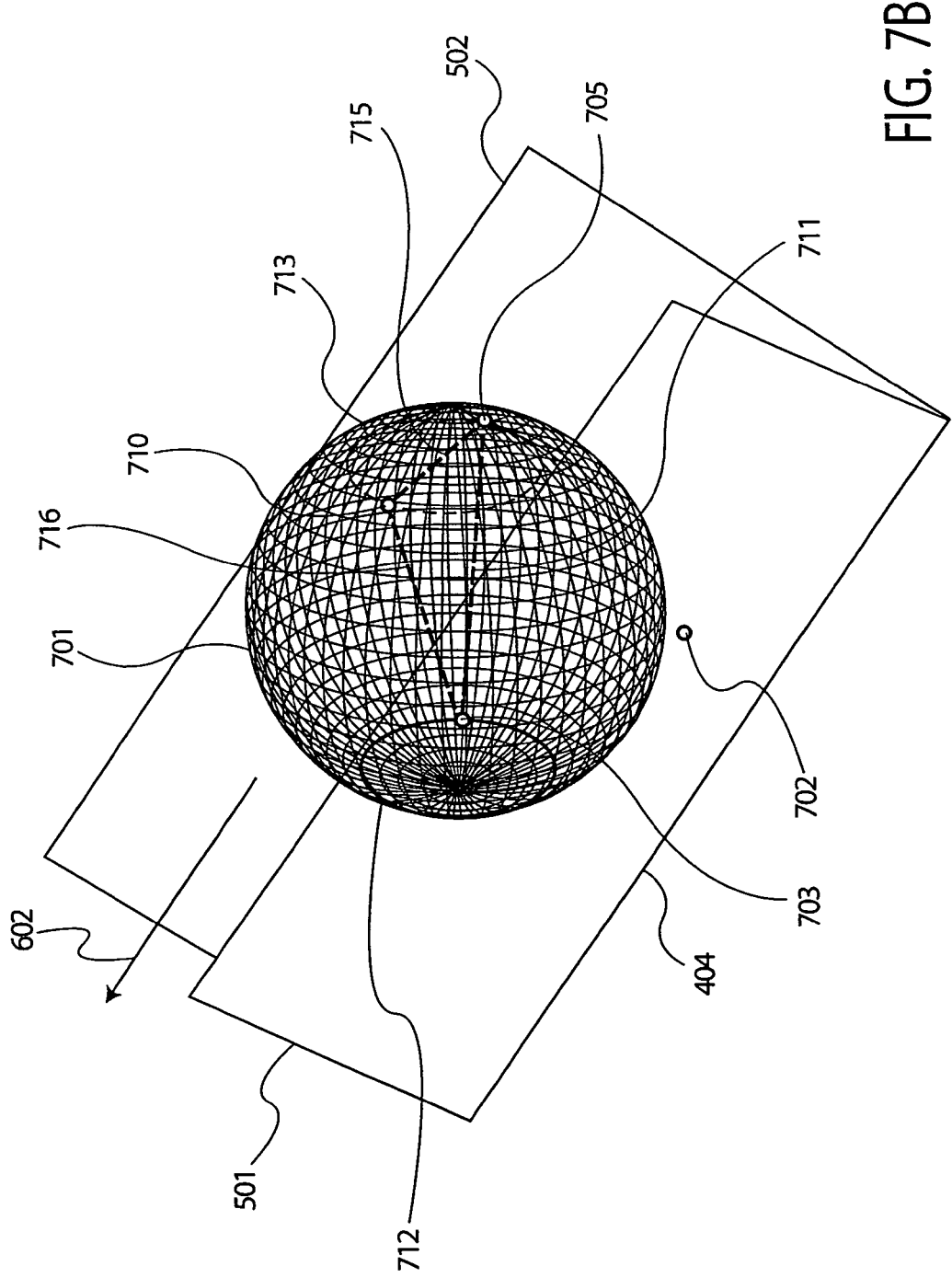
FIG. 7B shows how the ball of FIG. 7A can be pivoted along a sharp edge in a desired direction about a leg of a seed triangle.

As was the case with the ball-pivoting algorithm described herein above, ball 701 is pivoted until another point on either side 501 or side 502 comes into contact with the surface of ball 701. FIG. 7B shows the position of ball 701 after such a point has been encountered, here point 710 on surface 502. Specifically, when ball 701 contacts point 710, the pivoting about leg 711 stops. At this position, point 702 is no longer in contact with the surface of ball 701, since the ball 701 has moved incrementally in direction 602 along both sides 501 and 502 (and, hence, edge portion 404). Instead, points 703, 705 and 710 are now in contact with the surface of bail 701 at new contact circles 712 (point 703) and 713 (points 705 and 710). Thus, at this position, only one point from side 501 is in contact with ball 701 and, now, two points from side 502 are in contact with ball 701. Then, once again, a leg of triangle 715, such as leg 716, is selected about which to pivot ball 701. The ball is then once again pivoted so that it again moves in direction 602 until a new point on the surface is contacted and the process repeats. This process continues until the ball has moved along the entirety of edge 403 in direction 602 of FIG. 6. In this way, ball 701 is made to travel along a sharp edge created by the intersection of two sides, such as is created by, illustratively, cutting a triangle mesh surface.

Figure 8:
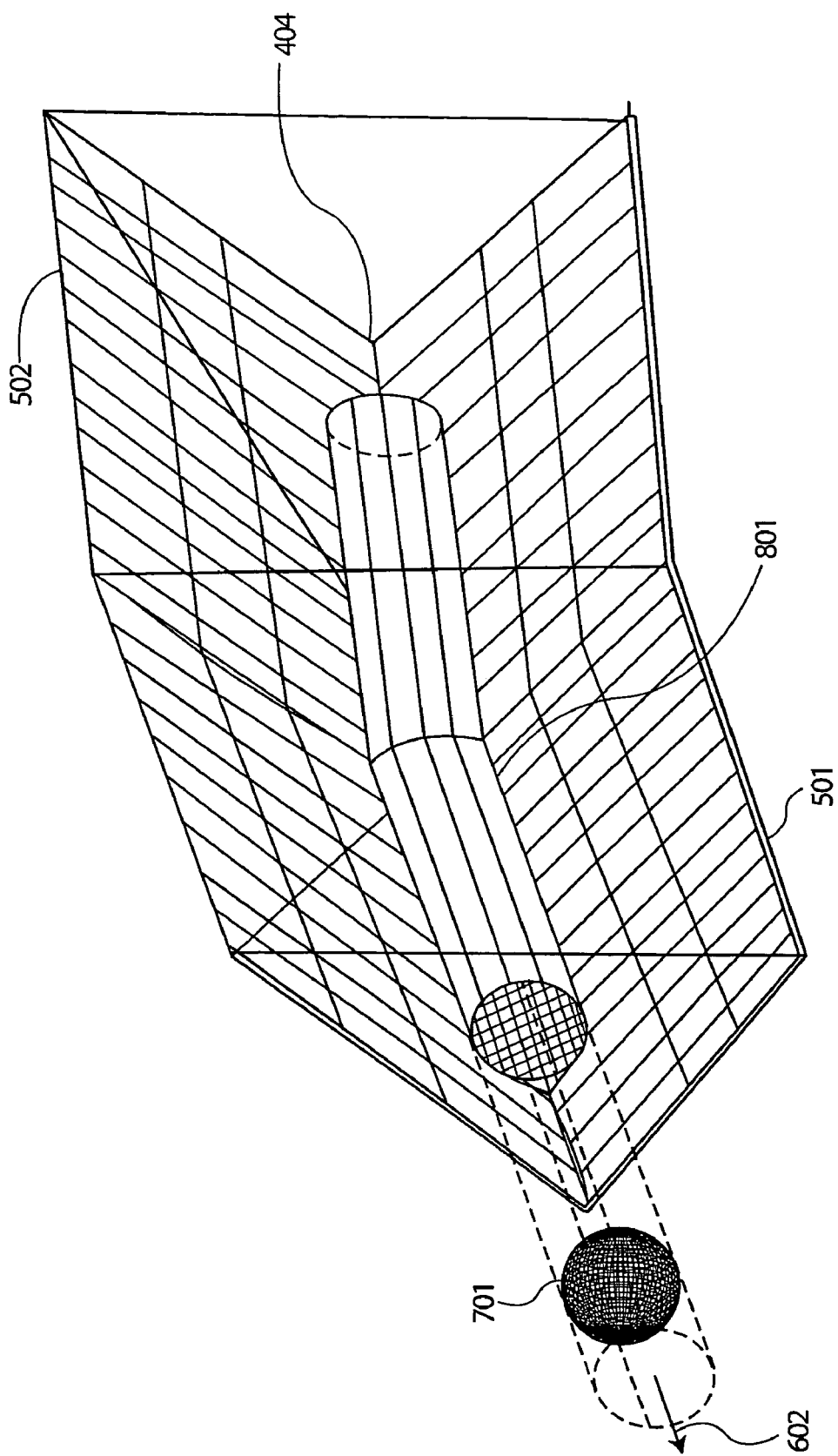
FIG. 8 shows a virtual tunnel that may be created as a result of pivoting the ball along a sharp edge as shown in FIG. 7B.

In accordance with another embodiment of the present invention, as the ball 701 moves in direction 602, the position of ball 701 at each point in time is, illustratively, recorded. As a result, after the ball has been moved along the entirety of edge 403, a virtual tunnel may be reconstructed representing the "tunnel" through which the ball passed along its path in direction 602. A portion of such a tunnel is shown in FIG. 8. Specifically, once again sides 501 and 502 and the resulting edge portion 404 where those sides meet are shown, this time from the perspective of the interior of shape 401 of FIG. 6. More specifically, FIG. 8 shows a virtual tunnel 801 that is created as a result of the foregoing process of moving ball 701 in direction 602 by pivoting ball 701 about individual legs of triangles that have at least one endpoint on side 501 and at least one endpoint on side 502, as discussed herein above. One skilled in the art will recognize that tunnel 801 will have a diameter equal to the diameter of ball 701 and will run the length of the edge to be smoothed (here edge 403 in FIG. 6).

Figure 9:
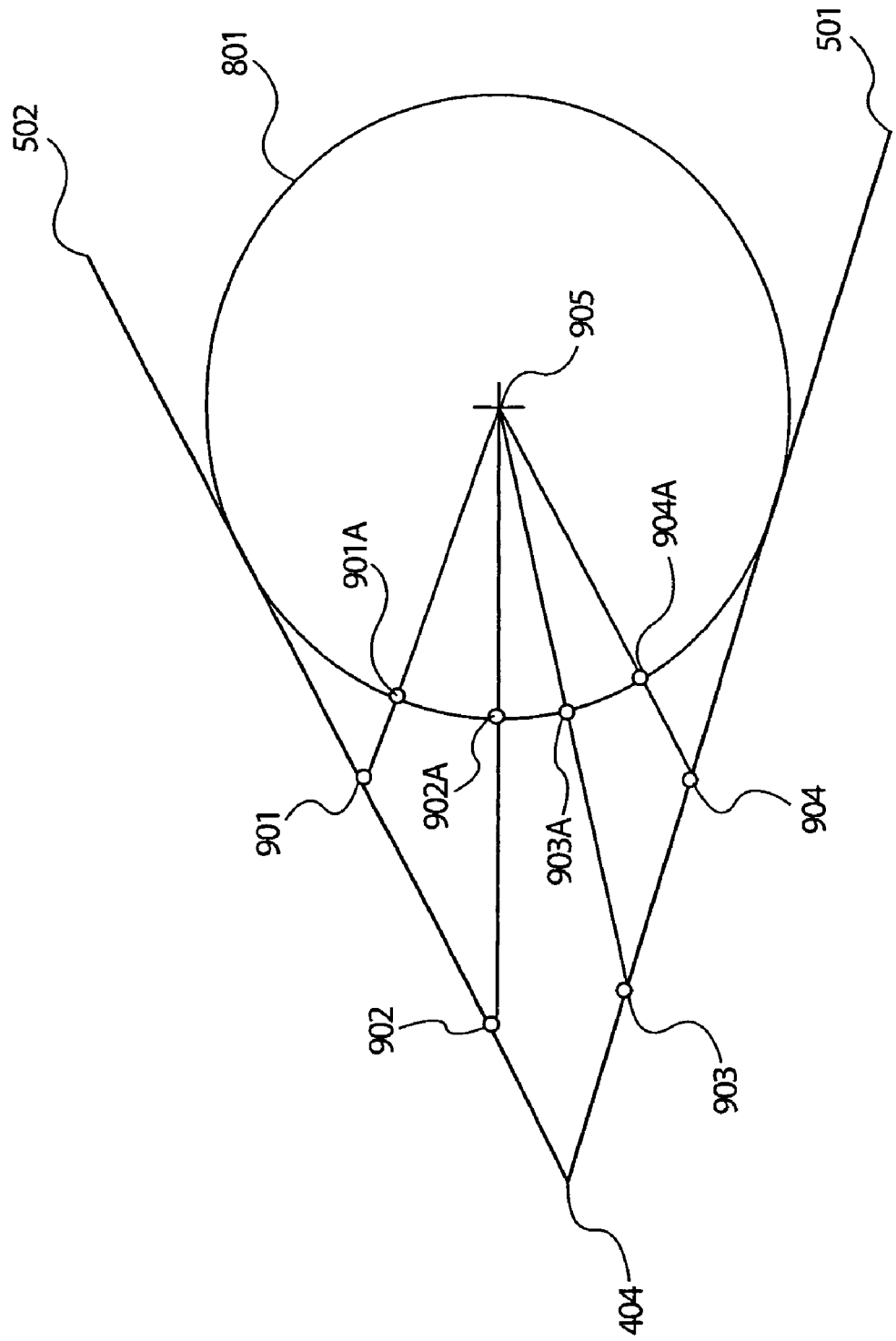
FIG. 9 shows how points in proximity to a sharp edge can be projected onto the surface of the virtual tunnel of FIG. 8.

Once a virtual tunnel has been constructed along the entire length of the edge to be smoothed, then remapping of points, referred to herein as edge points, on the sides 501 and 502 in proximity to sharp edge portion 404, to a smoother edge can be accomplished. FIG. 9 shows one illustrative embodiment of how such a remapping may be achieved. Specifically, FIG. 9 shows a cross section of tunnel 801, sides 502 and 501, as well as edge portion 404 which, once again, is a portion of the full edge 403 that is to be smoothed. Side 501 has edge points 901 and 902 in proximity to edge portion 404 and side 502 has edge points 903 and 904 in proximity to that edge portion. One skilled in the art will recognize that this is a greatly simplified diagram of a typical edge. Since FIG. 9 is a cross section view of tunnel 801, it merely represents one location along edge 403 of FIG. 6. In typical cases, there are a large number of points at any position along an edge to be smoothed. Points 901-904 are, therefore, merely illustrative in nature. One skilled in the art will recognize how to apply the principles described herein to any number of such points. Referring once again to FIG. 9, in order to smooth the sharp edge portion 404, edge points 901-904 are projected to the surface of tunnel 801. Such a projection is accomplished by, for example, drawing a line between each of points 901 and 904 to the center point of tunnel 801. Once these lines have been drawn, the intersection of each line and the surface of tunnel 801 is determined and a new point, referred to herein as a projected point, is created at that intersection. Thus, for example, such a projection of points 901, 902, 903 and 904 will result in new projected points 901A, 902A, 903A and 904A on the surface of tunnel 801. Points 901-904 may then be deleted or hidden from the representation of shape 401 of FIG. 6.

Figure 10:
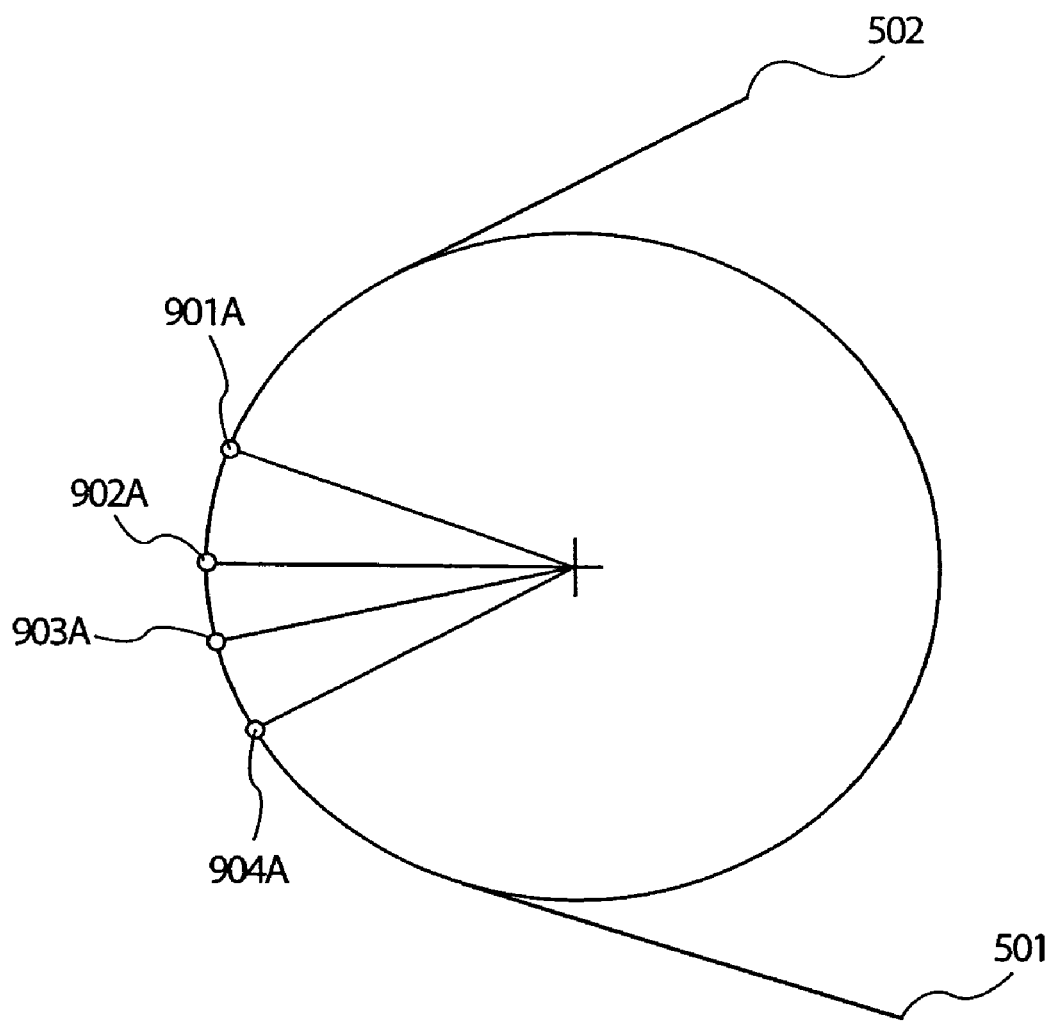
FIG. 10 shows how a sharp edge can be rounded as a result of the projection of FIG. 9.
Figure 11:
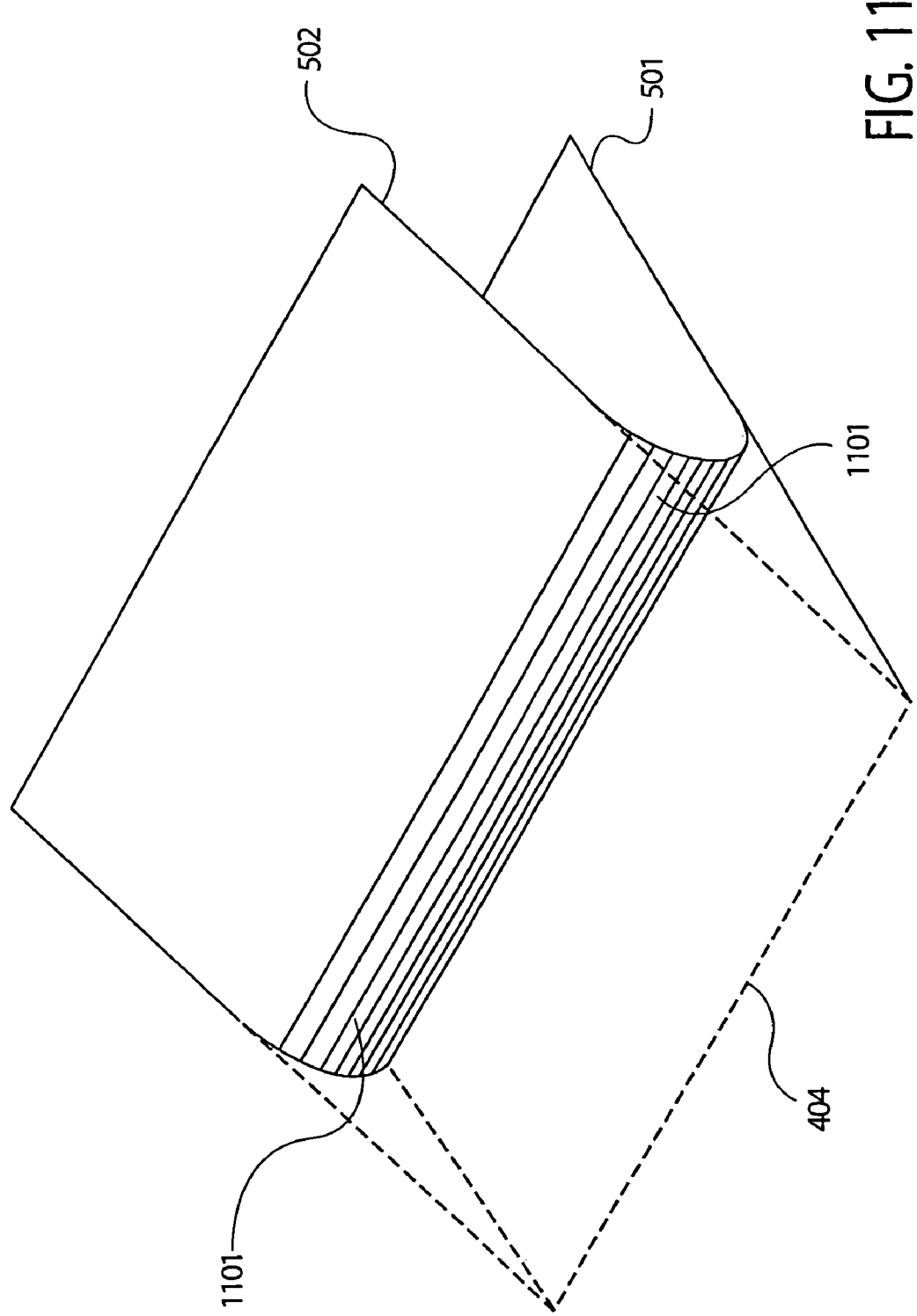
FIG. 11 shows a resulting rounded edge of a 3D shape after surface reconstruction of the edge.

FIG. 10 shows the result of the projection of edge points 901-904 onto the virtual tunnel 801 of FIG. 8, shown in FIG. 10 in cross-section. Specifically, referring to) FIG. 10, projected points 901A, 902A, 903A and 904A all lie on the rounded surface of that tunnel. The points along the portion of side 501 and 502 that were projected onto the tunnel have been hidden and/or deleted and, as a result, the points on sharp edge 403 including edge portion 404 have been replaced by points on a rounded surface. One skilled in the art will recognize that various methods may be used for connecting the points along the rounded surface of tunnel 801 to create an approximation of the surface of the rounded edge. Such methods include, without limitation, the aforementioned illustrative ball-pivoting algorithm for surface reconstruction. FIG. 11 shows the result of such surface reconstruction. Specifically, referring to that figure, sharp edge portion 404 at the original intersection of sides 501 and 502 of shape 401 of FIG. 4 has been replaced according to the foregoing methods by rounded edge 1101. Thus, according to the foregoing description, ball pivoting to create a virtual tunnel, followed by projection of points onto the tunnel provides a fast and efficient method for rounding and/or filleting undesired sharp edges.

Figure 12:
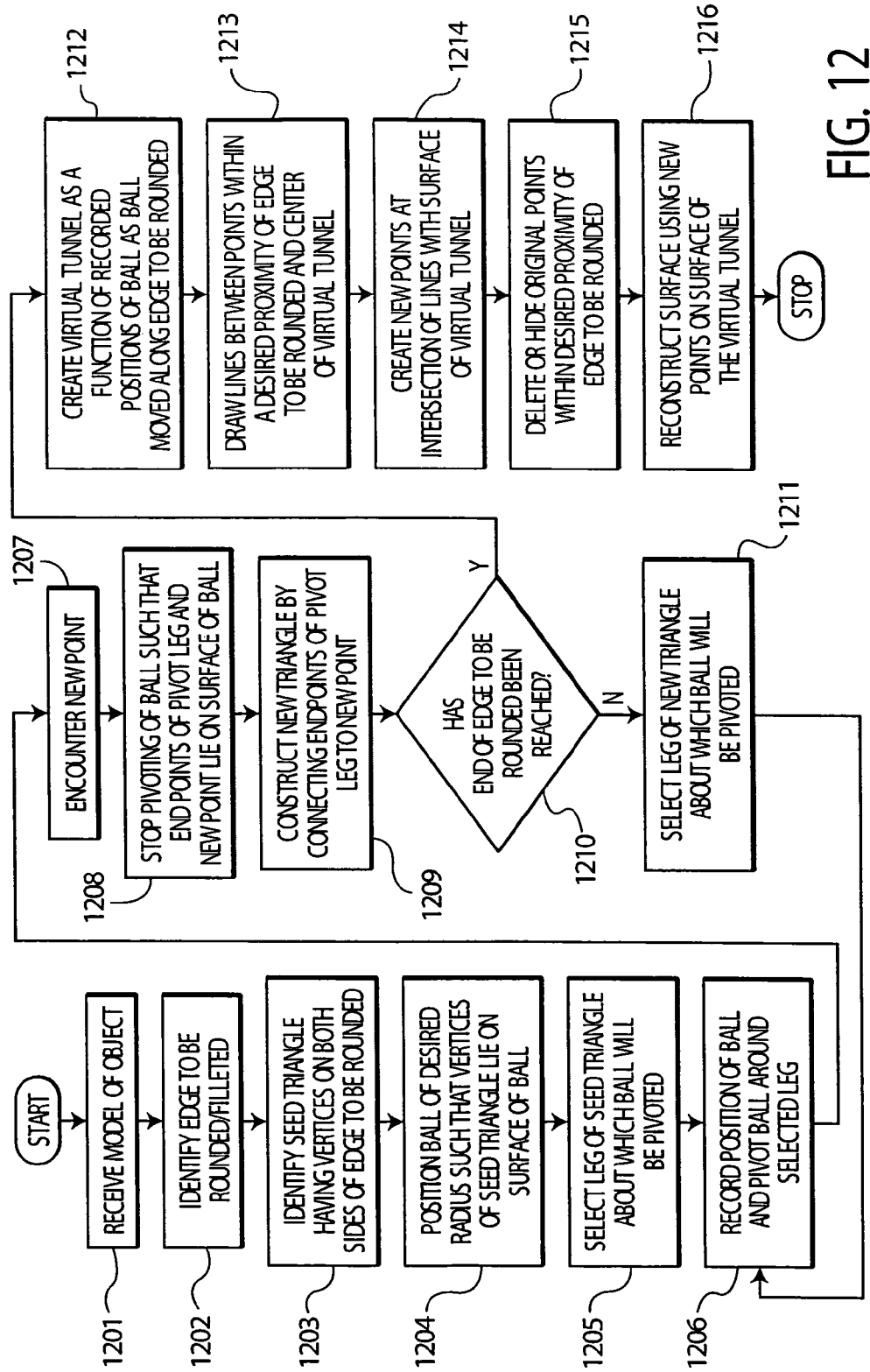
FIG. 12 is a flow chart showing the steps of a method in accordance with an embodiment of the present invention.

FIG. 12 is a flow chart showing the steps of an illustrative method in accordance with an embodiment of the present invention. Referring to that figure, at step 1201, a model of an object is received. Such a model may be, illustratively, a 3D point cloud representation having a surface approximated by a mesh of triangles. The model may also have been edited as discussed herein above in a way such that sharp edges resulted or, alternatively, the edges to be rounded may have been present on the object as scanned. Once that model has been received, at step 1202, at least one edge to be rounded or filleted is identified. Then, at step 1203, a seed triangle for use in ball pivoting is identified. As discussed herein above, all vertices of the seed triangle should illustratively lie on the sides of the edges, with at least one vertex located on each side. Once the seed triangle has been identified, at step 1204, a ball of a desired radius is positioned such that each of the vertices of the seed triangle lie on the surface of the ball. Then, at step 1205, a leg of the seed triangle is selected about which the ball will pivot and, at step 1206, the position of the ball is recorded and the ball is then pivoted about that leg in a desired direction along the edge to be rounded. At step 1207, another point on one of the sides of the edge to be rounded is encountered and, at step 1208, the pivoting of the ball is stopped such that the new point and the two end points of the leg about which the ball was pivoted lie on the surface of the ball. Then, at step 1209, a new triangle is constructed by drawing lines from the newly encountered point to each endpoint of the leg about which the ball was pivoted. Then, at step 1210, a determination is made whether the end of an edge to be rounded has been reached. If not, then, at step 1211, a new leg is identified about which the ball can be pivoted in the desired direction and the process returns to step 1206. If the determination is made at step 1210, then, at step 1212, a virtual tunnel is created from the recorded positions of the ball as it pivoted and moved along the edge to be rounded. Once the tunnel has been created, at step 1213, lines are drawn from each point within an identified proximity to the edge to be rounded to the center of the virtual tunnel. Then, at step 1214, new points are created at the point of intersection of each line and the surface of the virtual tunnel. At step 1215, the original points within a desired proximity of the edge to be rounded are hidden or deleted and, finally, at step 1216, the projected points along the surface of the virtual tunnel are connected via well-known surface reconstruction methods.

One skilled in the art will recognize that the performance of the above-described rounding methods and the results achieved by using those methods will vary depending on several factors. For example, the performance of a computer adapted to perform the above-described rounding will depend greatly on the number of points along the edge(s) to be rounded. A large number of points will tend to increase the time required to construct the virtual tunnel and, once that tunnel is constructed, will increase the time required to project a large number of points onto the surface of the tunnel. Similarly, the degree of desired rounding will also determine the relative speed of the rounding operation. Specifically, if an edge is to be highly rounded, i.e., if the radius of the edge is to be large, then such a rounded edge will require a virtual tunnel with a large diameter. It follows that the ball used to create the virtual tunnel will require the same large diameter. Such a large diameter ball will increase the number of points reached in the ball pivoting operation as well as the number of points to be projected onto the tunnel once that tunnel has been constructed. However, even in the case of a large ball, the computational complexity will still be lower than some prior attempts, such as well known attempts that required the resampling of the entire surface of an object after rounding operations. In accordance with the foregoing embodiments, only those points nearest the edge to be rounded will require projection onto the virtual tunnel followed by reconstruction of the rounded surface.

Figure 13:
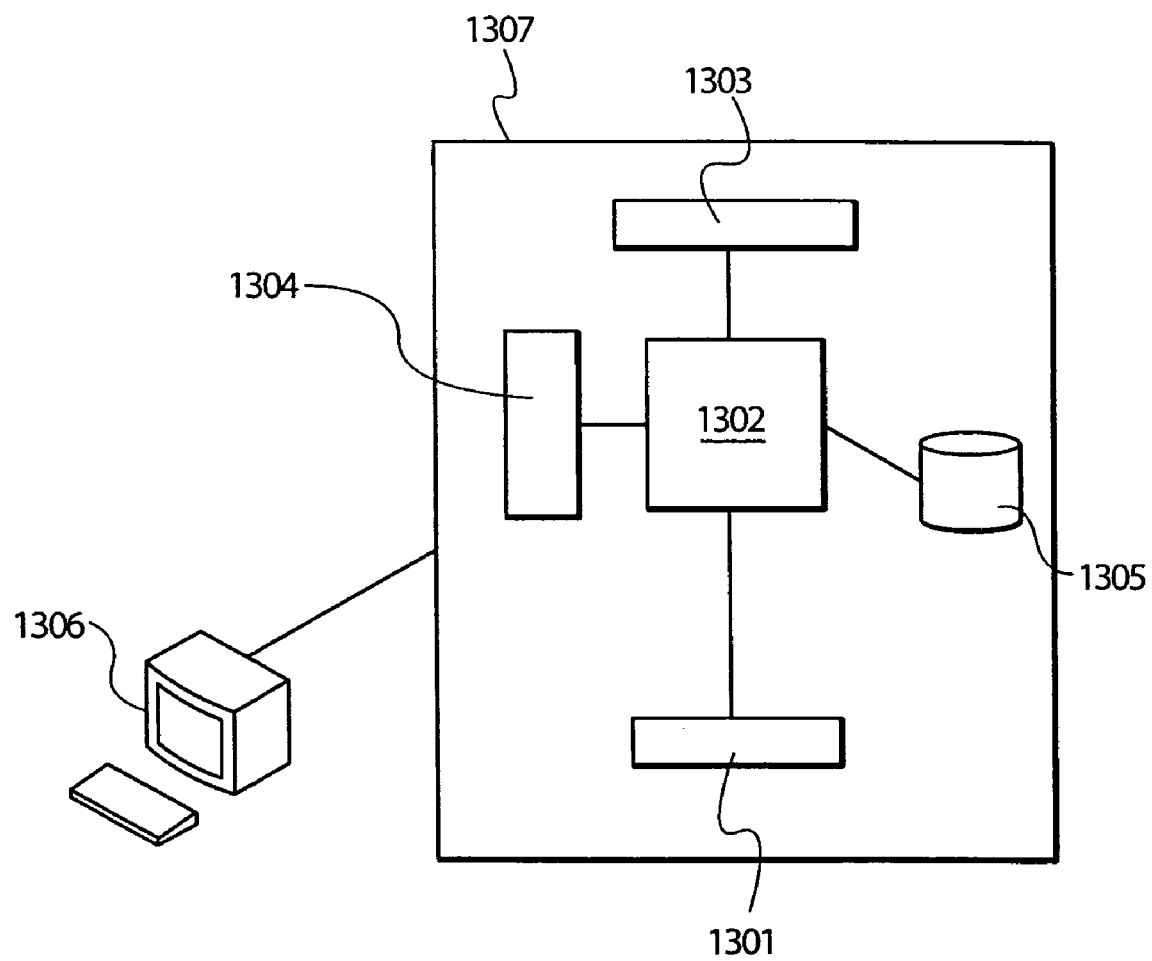
FIG. 13 shows a computer adapted to perform the illustrative steps of the method of FIG. 12 as well as other functions associated with the rounding and filleting of sharp edges of 3D shapes.

The foregoing embodiments are generally described in terms of manipulating objects, such as lines, triangles, balls, edges and tunnels associated with smoothing sharp edges of a 3D shape. One skilled in the art will recognize that such manipulations may be, in various embodiments, virtual manipulations accomplished in the memory or other circuitry/hardware of an illustrative computer aided design (CAD) system. For example, one skilled in the art will recognize that all references to moving a ball or, alternatively, for moving a representation of a ball, as described herein above and in the claims, refer illustratively to virtual manipulations or movements of a virtual ball in the memory of a computer system, such as the aforementioned CAD system. Such a CAD system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 13. Referring to that figure, a CAD system 1307 is implemented on a suitable computer adapted to receive, store and transmit data such as the aforementioned positional information associated with the features of a 3D shape. Specifically, illustrative CAD system 1307 may have, for example, a processor 1302 (or multiple processors) which controls the overall operation of the CAD system 1307. Such operation is defined by computer program instructions stored in a memory 1303 and executed by processor 1302. The memory 1303 may be any type of computer readable medium, including without limitation electronic, magnetic, or optical media. Further, while one memory unit 1303 is shown in FIG. 13, it is to be understood that memory unit 1303 could comprise multiple memory units, with such memory units comprising any type of memory. CAD system 1307 also comprises illustrative modem 1301 and network interface 1304. CAD system 1307 also illustratively comprises a storage medium, such as a computer hard disk drive 1305 for storing, for example, data and computer programs adapted for use in accordance with the principles of the present invention as described hereinabove. Finally, CAD system 1307 also illustratively comprises one or more input/output devices, represented in FIG. 13 as terminal 1306, for allowing interaction with, for example, a technician or database administrator. One skilled in the art will recognize that CAD system 1307 is merely illustrative in nature and that various hardware and software components may be adapted for equally advantageous use in a computer in accordance with the principles of the present invention.

One skilled in the art will also recognize that the software stored in the computer system of FIG. 13 may be adapted to perform various tasks in accordance with the principles of the present invention. In particular, such software may be graphical software adapted to import surface models of shapes, for example those models generated from three-dimensional laser scanning of objects. In addition, such software may allow for selective editing of those models in a way that creates sharp edges, as described above, or that permits a user to remove or reshape various portions of those models as described above. The software of a computer-based system such as CAD system 1307 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for rounding an edge between two sides of a surface, said surface comprising a plurality of points connected to form a triangle mesh, said method comprising:
    moving a representation of a ball parallel to said edge in a predetermined direction;
    defining, by a processor, a virtual tunnel as a function of a plurality of positions of said ball as said ball moves parallel to said edge;
    identifying a plurality of projected points by projecting a plurality of edge points to a surface of said virtual tunnel; and
    connecting said projected points in said plurality of projected points;
    wherein a radius of said ball is selected in a way such that no point disposed on either of said two sides is positioned inside a volume of said ball; and
    wherein the virtual tunnel contacts the two sides defining a line on each side.

2. The method of claim 1 wherein said step of identifying a plurality of projected points comprises:
    identifying a plurality of intersections of a plurality of lines with said surface of said virtual tunnel, said plurality of lines comprising lines between said plurality of edge points and a center of said virtual tunnel; and
    disposing points on said surface of said virtual tunnel at each intersection in said plurality of intersections.

3. The method of claim 1 wherein said step of connecting said projected points comprises growing a triangle mesh.

4. The method of claim 1 wherein the representation of the ball is moved parallel to said edge at a distance from the edge such that a surface of the ball contacts said two sides.

5. The method of claim 1 wherein the plurality of edge points projected to a surface of said virtual tunnel to identify a plurality of projected points are the set of points between the line on each side and the edge.

6. An apparatus for use in rounding an edge between two sides of a surface of a model, said surface comprising a plurality of points connected to form a triangle mesh, said apparatus comprising:

means for moving a representation of a ball parallel to said edge in a predetermined direction;

means for defining a virtual tunnel as a function of a plurality of positions of said ball as said ball moves parallel to said edge;

means for identifying a plurality of projected points by projecting a plurality of edge points to a surface of said virtual tunnel; and means for connecting said projected points in said plurality of projected points;

wherein a means for selecting a radius of said ball comprises means for selecting said radius in a way such that no point disposed on either of said two sides is positioned inside a volume of said ball; and wherein the virtual tunnel contacts the two sides defining a line on each side.

7. The apparatus of claim 6 wherein said means for identifying a plurality of projected points comprises:

means for identifying a plurality of intersections of a plurality of lines with said surface of said virtual tunnel, said plurality of lines comprising lines between said plurality of edge points and a center of said virtual tunnel; and means for disposing points on said surface of said virtual tunnel at each intersection in said plurality of intersections.

8. The apparatus of claim 6 wherein said means for connecting said projected points comprises means for growing a triangle mesh.

9. The apparatus of claim 6 wherein the representation of the ball is moved parallel to said edge at a distance from the edge such that a surface of the ball contacts said two sides.

10. The apparatus of claim 6 wherein the plurality of edge points projected to a surface of said virtual tunnel to identify a plurality of projected points are the set of points between the line on each side and the edge.

11. A computer readable medium storing computer program instructions which, when executed by a processor, define steps for rounding an edge between two sides of a surface of a model, said surface comprising a plurality of points connected to form a triangle mesh, said steps comprising:

moving a representation of a ball parallel to said edge in a predetermined direction;

defining a virtual tunnel as a function of a plurality of positions of said ball as said ball moves parallel to said edge;

identifying a plurality of projected points by projecting a plurality of edge points to a surface of said virtual tunnel; and connecting said projected points in said plurality of projected points;

wherein computer program instructions for selecting a radius of said ball comprise computer program instructions for selecting said radius in a way such that no point disposed on either of said two sides is positioned inside a volume of said ball; and wherein the virtual tunnel contacts the two sides defining a line on each side.

12. The computer readable medium of claim 11 wherein said computer program instructions defining the step of identifying a plurality of projected points comprise computer program instructions defining the steps of:

identifying a plurality of intersections of a plurality of lines with said surface of said virtual tunnel, said plurality of lines comprising lines between said plurality of edge points and a center of said virtual tunnel; and disposing points on said surface of said virtual tunnel at each intersection in said plurality of intersections.

13. The computer readable medium of claim 11 wherein said computer program instructions defining the step of connecting said projected points comprise computer program instructions defining the step of growing a triangle mesh.

14. The computer readable medium of claim 11 wherein the representation of the ball is moved parallel to said edge at a distance from the edge such that a surface of the ball contacts said two sides.

15. The computer readable medium of claim 11 wherein the plurality of edge points projected to a surface of said virtual tunnel to identify a plurality of projected points are the set of points between the line on each side and the edge.

\* \* \* \* \*